United States Patent [19]

Domeniconi et al.

[11] 4,403,021
[45] Sep. 6, 1983

[54] ELECTROCHEMICAL CELL AND ELECTROLYTIC SOLUTION THEREFOR

[75] Inventors: Michael J. Domeniconi, Santa Clara, Calif.; Carl R. Schlaikjer, Winchester; Clifton A. Young, Bedford, both of Mass.

[73] Assignee: GTE Laboratories Incorporated, Waltham, Mass.

[21] Appl. No.: 447,049

[22] Filed: Dec. 6, 1982

Related U.S. Application Data

[63] Continuation of Ser. No. 147,985, May 8, 1980, abandoned.

[51] Int. Cl.³ .............................................. H01M 6/16
[52] U.S. Cl. ..................................... 429/101; 429/196; 429/199
[58] Field of Search ............... 429/101, 196, 197, 199, 429/200, 194

[56] References Cited

U.S. PATENT DOCUMENTS

| | | | |
|---|---|---|---|
| 3,567,515 | 3/1971 | Maricle et al. | 429/197 X |
| 3,926,669 | 12/1975 | Auborn | 429/196 |
| 4,012,564 | 3/1977 | Auborn | 429/194 |
| 4,020,240 | 4/1977 | Schlaikjer | 429/199 |

OTHER PUBLICATIONS

Gabano et al., "Lithium Thionyl Chloride Bobbin Cells: Present Status and Performance", Proceedings of the Symposium on Battery Design, and Optimization, The Electrochemical Society, Princeton, vol. 79-1, pp. 348-355, 1979.

*Primary Examiner*—Anthony Skapars
*Attorney, Agent, or Firm*—David M. Keay

[57] ABSTRACT

An electrochemical cell having an oxidizable anode containing lithium and a cathode current collector. The cell includes an electrolytic solution in contact with the anode and the cathode current collector. The solution includes a solvent which is also a reducible liquid cathode material, specifically $SOCl_2$, and an electrolyte solute consisting of the reaction products of a salt of an oxyacid, specifically $Li_2SO_3$, constituting a Lewis base and a Lewis acid, specifically $AlCl_3$, dissolved in the solvent.

11 Claims, 4 Drawing Figures

ELECTROCHEMICAL CELL AND ELECTROLYTIC SOLUTION THEREFOR

This is a continuation of application Ser. No. 147,985, filed May 8, 1980, now abandoned.

BACKGROUND OF THE INVENTION

This invention relates to electrochemical cells. More particularly, it is concerned with electrochemical cells employing non-aqueous electrolytic solutions and to electrolytic solutions therefor.

A particularly effective class of electrochemical cells which employs soluble or liquid cathode materials has undergone rapid development in recent years. In these cells the active cathode material is usually a fluid solvent for an electrolyte solute which provides conductivity. The active anode for these cells is usually lithium or other highly electropositive metal. During discharge the solvent is electrochemically reduced on a cathode current collector to yield ions, e.g., halide ions, which react with positive metals ions from the anode to form insoluble metal salts, e.g., metal halides.

One particular type of electrochemical cell of the foregoing class which contains a lithium anode employs a reducible liquid cathode of thionyl chloride. Typically the electrolyte solute dissolved in the thionyl chloride solvent is lithium tetrachloroaluminate. This salt is prepared from the Lewis acid aluminum chloride and the Lewis base lithium chloride. A Lewis acid is any compound capable of entering into a chemical reaction by accepting an electron pair to form a covalent bond, and a Lewis base is any compound capable of entering into a chemical reaction by donating an electron pair to form a covalent bond. Lithium/thionyl chloride electrochemical coils have proven to have outstanding weight and volume energy density, long shelf life, and unusually high power density when compared with other cells presently available.

Under unfavorable circumstances during prolonged storage or storage under extreme conditions, corrosion of the lithium anode in a cell causes a film of lithium chloride and grow on the anode sufficient to cause significant polarization at the onset of discharge of the cell. After operating at a reduced potential for a period of time, a cell may recover depending upon the severity of the condition. This initial polarization is referred to as voltage delay and has been found particularly troublesome in cells which are required to operate at current densities higher than 1 mA/cm$^2$.

Various attempts have been made to overcome the problem of voltage delay upon startup. In one technique described in U.S. Pat. No. 4,020,240 to Carl R. Schlaikjer dated Apr. 26, 1977, a lithium clovoborate salt such as $Li_2B_{10}Cl_{10}$ is employed as the electrolyte solute. In another technique described by J. P. Gabano in paper #27, presented at the Electrochemical Society Fall Meeting, Pittsburgh, Oct. 15–20, 1978, the electrolyte solute is a salt prepared by dissolving lithium oxide in thionyl chloride containing aluminum chloride. It is postulated that the salt produced by the reaction is $Li_2(AlCl_3O\,AlCl_3)$. Although the solutes of Schlaikjer and Gabano provide cells having improved startup characteristics, either they are expensive, difficult to purify or less conductive than presently used materials.

SUMMARY OF THE INVENTION

An improved electrolytic solution in accordance with the present invention includes a solvent and an electrolyte solute consisting of the reaction products of a salt of an oxyacid which constitutes a Lewis base together with a Lewis acid dissolved in the solvent. An electrochemical cell in accordance with the present invention employs the electrolytic solution in combination with an oxidizable anode material and a reducible cathode material. The solvent may include the reducible cathode material in liquid form. Cells in accordance with the invention provide satisfactory startup characteristics without undesirable consequences.

For a better understanding of the present invention, together with other and further objects, advantages, and capabilities thereof, reference is made to the following discussion and appended claims in connection with the above described drawings.

DETAILED DESCRIPTION OF THE INVENTION

The present invention relates to non-aqueous electrolytic solutions containing an electrolyte salt produced by the reaction of a salt of an oxyacid which constitutes a Lewis base with a Lewis acid. Salts of oxyacids which may be employed in electrolytic solutions of the invention provide a cation of an alkali metal, alkaline earth metal, ammonium, alkyl ammonium, pyridinium, alkyl pyridinium, scandium, yttrium, or a rare earth. Suitable oxyacid salts provide an anion such as orthoborate, metaborate, aluminate, $CO_3^{2-}$, $SiO_3^{2-}$, $GeO_3^{2-}$, $SnO_3^{2-}$, $NO_3^-$, $PO_3^{3-}$, $PO_4^{3-}$, $AsO_3^{3-}$, $AsO_4^{3-}$, $SO_3^{2-}$, $SO_4^{2-}$, $SeO_4^{2-}$, $TeO_4^{2-}$, $TeO_4^{3-}$, $S_2O_4^{--}$, $S_2O_6^{--}$, polythionate, thiosulfate, molybdate, phosphomalybdate, tungstate, $ClO_3^-$, $ClO_4^-$, $BrO_3^-$, $BrO_4^-$, $IO_3^-$, and $IO_4^-$. The oxyacid salt is reacted with a Lewis acid such as $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $TlCl_3$, $TlF_3$, $SiF_4$, and $GeCl_4$.

The solute is produced by the reaction obtained by dissolving the salt of an oxyacid and a Lewis acid in a solvent. The solvent may be an electrochemically reducible liquid such as an oxyhalide of sulfur, phosphorus, or selenium. It may also be a fluid non-metallic oxide, or a fluid non-metallic halide, or mixtures thereof. Other classes of solvent which may be utilized include aliphatic ethers, alicylic ethers, esters, cyclic esters, cyclic lactones, anhydrides, nitriles, amides, and ureas.

Electrochemical cells utilizing electrolytic solutions in accordance with the present invention may also employ oxidizable anode materials other than lithium. The anode material may be another alkali metal, an alkaline earth metal, scandium, yttrium, or a rare earth.

Figure 1:
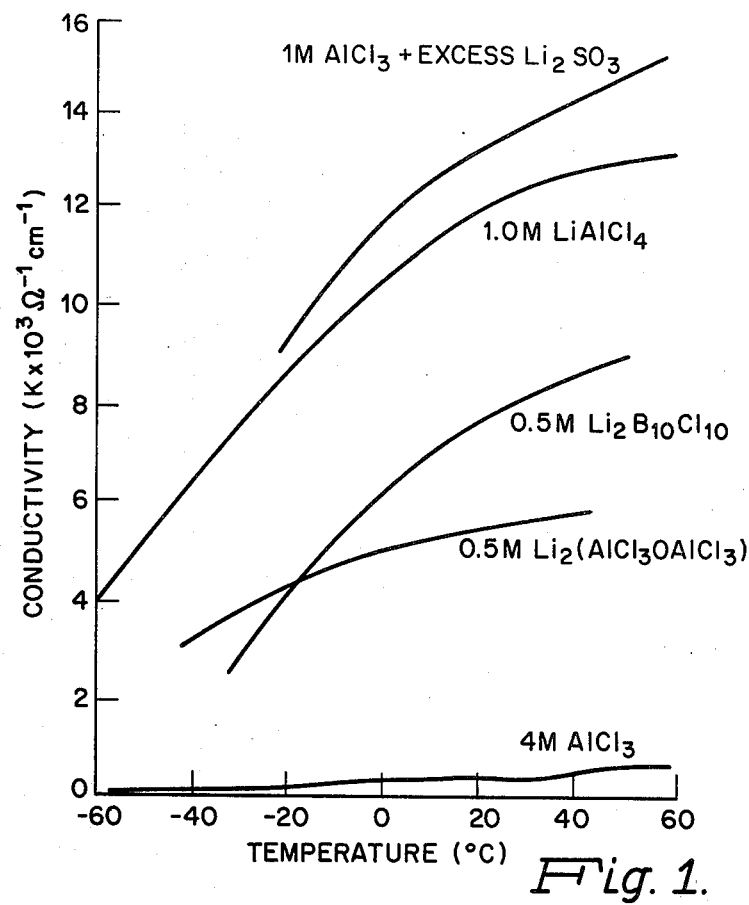
FIG. 1 is a graph illustrating the conductivity of an electrolytic solution in accordance with the present invention in comparison with other solutions.

More specifically, an electrolytic solution particularly useful in electrochemical cells employing lithium and thionyl chloride was obtained by reacting aluminum chloride ($AlCl_3$), a Lewis acid, with lithium sulfite ($Li_2SO_3$), which constitutes a Lewis base. A 1 M solution of $AlCl_3$ in $SOCl_2$ was stirred while being heated under reflux with enough solid $Li_2SO_3$ to provide a stoichiometric ratio of $AlCl_3$ to $Li_2SO_3$ of 2 to 1.1. The conductivity of the solution was tested at various temperatures and the curve of conductivity versus temperature is plotted in FIG. 1. Curves illustrating the conductivity of a 1.0 M solution of $LiAlCl_4$ in $SOCl_2$, a 0.5 M solution of $Li_2B_{10}Cl_{10}$ in $SOCl_2$, and a 4 M solution of $AlCl_2$ in $SOCl_2$ are also shown in FIG. 1. Also shown is a curve illustrating the conductivity of a 0.5 M $Li_2(AlCl_3OAlCL_3)$ solution in $SOCl_2$. It is postulated that this is the salt produced by dissolving $Li_2O$ in $SOCl_2$ containing $AlCl_3$ in accordance with the teachings in the aforementioned article by Gabano. As can be seen from the curves of FIG. 1 the conductivity of applicants' solution compares favorably with that of lithium tetrachloroaluminate and is significantly higher than that of solutions containing lithium clovoborate and the salts prepared in accordance with the technique of Gabano.

The properties of the electrolytic solution of the present invention indicate that a soluble lithium salt is a product of the reaction of the $Li_2SO_3$ and $AlCl_3$ in $SOCl_2$. It may be that the $Li_2SO_3$, acting as a Lewis base, forms an adduct salt with the $AlCl_3$, a Lewis acid.

Figure 2:
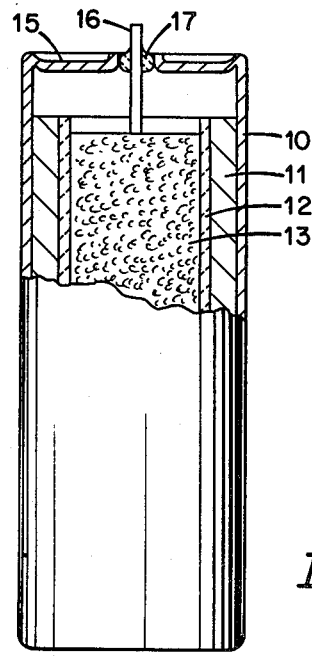
FIG. 2 is an elevational view partially in cross section of an electrochemical cell in accordance with the present invention.

Several electrochemical cells as illustrated in FIG. 2 were constructed. Some were filled with an electrolytic solution containing lithium tetrachloroaluminate as a solute and some were filled with an electrolytic solution in accordance with the present invention. The cells were about the size of commercial AA cells, approximately $1\frac{7}{8}$ inches long and $\frac{1}{2}$ inch in diameter. The cases 10 were of stainless steel. Anodes 11 of lithium metal were pressed to the inside walls of the cases 10. Concentric bobbin cathodes 13 of Shawinigan carbon black and Teflon formed as an aqueous dispersion and dried were placed in the cases encircled by separators 12 of insulating material. After being filled with an electrolytic solution, each case was sealed with a cover 15 having a conductive lead 16 to the cathode 13 through a glass-to-metal seal 17.

Some of the cells were filled with a 1.8 M solution of $LiAlCl_4$ in $SOCl_2$. Other cells were filled with an electrolytic solution in accordance with the present invention. The solution was prepared by refluxing a solution of $AlCl_3$ in $SOCl_2$ with excess $Li_2SO_3$ for sixteen days. The mixture was then filtered and diluted each that the concentration of aluminum was reduced to about 3 M. For both electrolytic solutions the $SOCl_2$ solvent was the reducible liquid cathode material of the cells.

Figure 3:
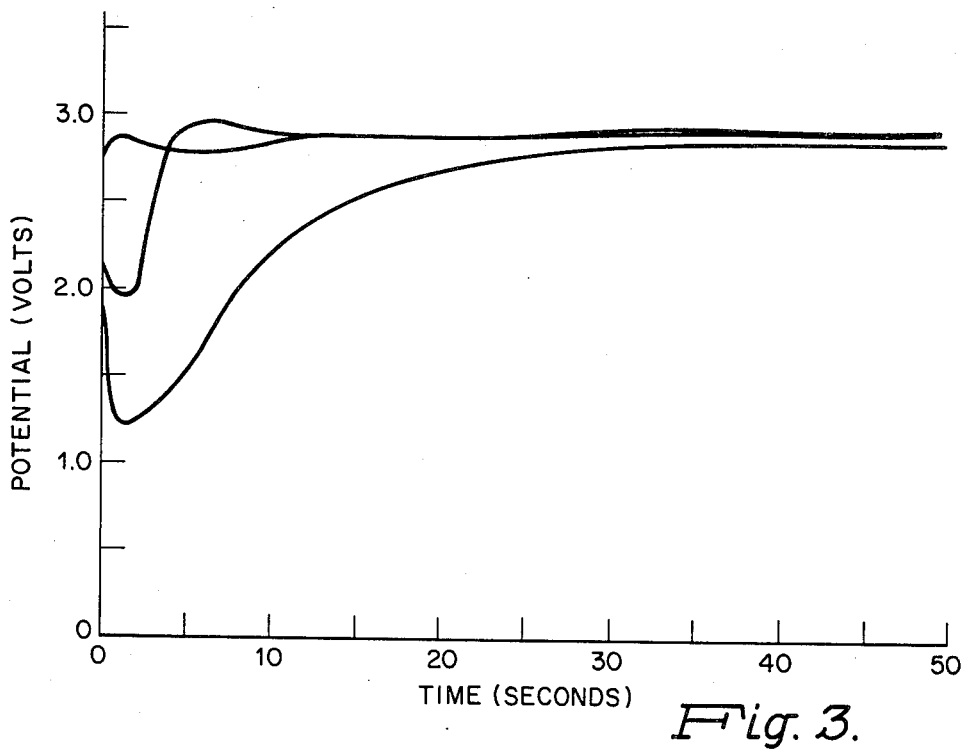
FIG. 3 is a graph illustrating the startup characteristics of electrochemical cells of previously known type.
Figure 4:
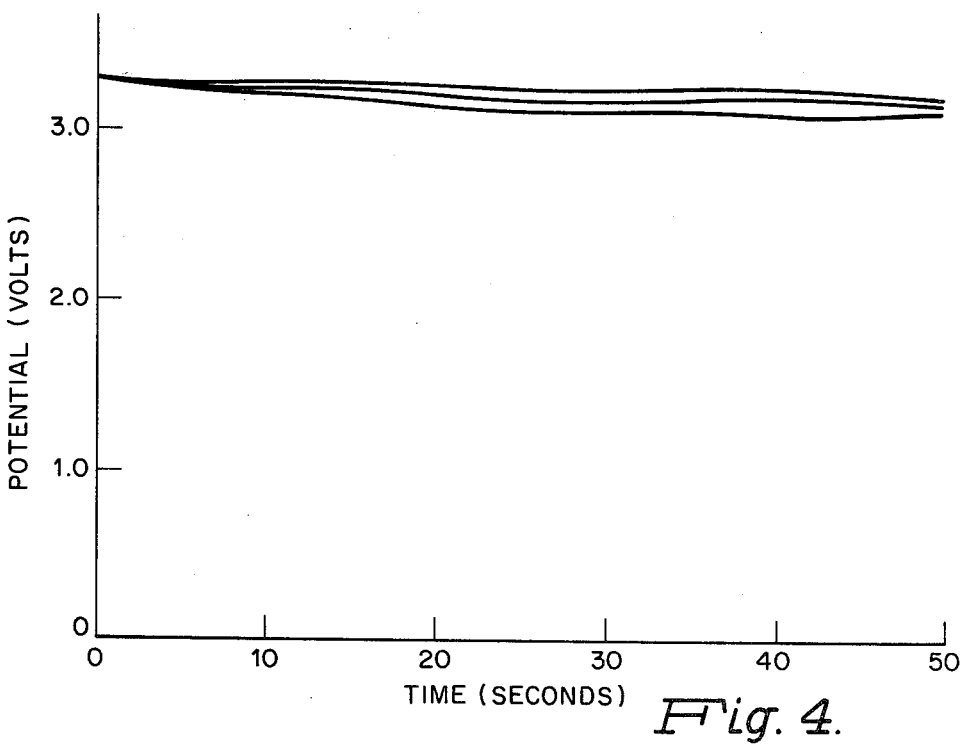
FIG. 4 is a graph illustrating the startup characteristics of electrochemical cells in accordance with the present invention.

Three cells containing $LiAlCl_4$ as a solute and three cells with $Li_2SO_3$ and $AlCl_3$ were stored for four days at 72° C. The startup characteristics of these cells at room temperature under a load of 50 ohms and current densities at about 4.8 mA/cm$^2$ were recorded. The resulting curves of output voltage versus time for the cells employing $LiAlCl_4$ in $SOCl_2$ are shown in FIG. 3. Output voltage versus time for the three cells containing the reaction products of $Li_2SO_3$ and $AlCl_3$ in $SOCl_2$ are shown in FIG. 4. As indicated by FIGS. 3 and 4 electrochemical cells employing an electrolytic solution in accordance with the present invention operate at full operating potential immediately upon startup without the voltage delay problem encountered with previously known devices.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
   an oxidizable anode material;
   a cathode current collector; and
   an electrolytic solution, in contact with the anode material and the cathode current collector, comprising a reducible liquid cathode material and an electrolyte solute consisting of the reaction products of lithium sulfite and a Lewis acid dissolved in the liquid cathode material.

2. An electrochemical cell in accordance with claim 1 wherein
   the lewis acid is selected from the group consisting of $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $TiCl_3$, $TiF_3$, $SiF_4$, and $GeCl_4$.

3. An electrochemical cell in accordance with claim 2 wherein
   the reducible liquid cathode material is selected from the group consisting of fluid oxyhalides, fluid non-metallic oxides, fluid non-metallic halides, and mixtures thereof; and
   the oxidizable anode material is selected from the group consiting of alkali metals, alkaline earth metals, scandium, yttrium, and rare earths.

4. An electrochemical cell in accordance with claim 3 wherein
   the reducible liquid cathode material is selected from the group consisting of oxyhalides of sulfur, phosphorus and selenium;
   the Lewis acid is aluminum chloride; and
   the oxidizable anode material is lithium metal.

5. An electrochemical cell in accordance with claim 4 wherein
   the reducible liquid cathode material is thionyl chloride.

6. An electrolytic solution including in combination
   a liquid electrochemically reducible solvent; and
   an electrolyte solute consisting of the reaction products of lithium sulfite and a Lewis acid dissolved in the solvent.

7. An electrolytic solution in accordance with claim 6 wherein
   the liquid electrochemically reducible solvent is selected from the group consisting of fluid oxyhalides, fluid non-metallic oxides, fluid non-metallic halides, and mixtures thereof.

8. An electrolytic solution in accordance with claim 6 wherein
   the lewis acid is selected from the group consisting of $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $TlCl_3$, $TlF_3$, $SiF_4$, and $GeCl_4$.

9. An electrolytic solution in accordance with claim 8 wherein the liquid electrochemically reducible solvent is selected from the group consisting of fluid oxyhalides, fluid non-metallic oxides, fluid non-metallic halides, and mixtures thereof.

10. An electrolytic solution in accordance with claim 9 wherein
the liquid electrochemically reducible solvent is selected from the group consisting of oxyhalides of sulfur, phosphorus, and selenium; and
the Lewis acid is aluminum chloride.

11. An electrolytic solution in accordance with claim 10 wherein
the liquid electrochemically reducible solvent is thionyl chloride.

* * * * *